(12) United States Patent
Castagna et al.

(10) Patent No.: US 11,684,851 B2
(45) Date of Patent: Jun. 27, 2023

(54) VIDEO GAME WITH MOBILE DEVICE INPUT DYNAMICS

(71) Applicant: Activision Publishing, Inc., Santa Monica, CA (US)

(72) Inventors: William Christopher Castagna, Albany, NY (US); Simon Davidian, London (GB); Kristin Krabseth Fellingfors, London (GB); Robert Louis Gallerani, Wynantskill, NY (US); Joshua David Huber, Niskayuna, NY (US); Daniel Kay, Bracknell (GB); Brian Edward Labore, Delmar, NY (US); Keelan Ronald Massicotte, Troy, NY (US); Robert Ewan Orr, London (GB); Valeria Prandina, London (GB)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 0 days.

(21) Appl. No.: 16/952,342

(22) Filed: Nov. 19, 2020

(65) Prior Publication Data

US 2021/0146245 A1    May 20, 2021

Related U.S. Application Data

(60) Provisional application No. 62/937,599, filed on Nov. 19, 2019.

(51) Int. Cl.
*A63F 13/50* (2014.01)
*A63F 13/92* (2014.01)
*A63F 13/21* (2014.01)

(52) U.S. Cl.
CPC .............. *A63F 13/50* (2014.09); *A63F 13/21* (2014.09); *A63F 13/92* (2014.09)

(58) Field of Classification Search
CPC .......... A63F 13/50; A63F 13/21; A63F 13/92; A63F 13/2145; A63F 13/428; A63F 13/211
USPC ......................................................... 463/32
See application file for complete search history.

(56) References Cited

U.S. PATENT DOCUMENTS

| | | | | |
|---|---|---|---|---|
| 5,531,644 | A * | 7/1996 | Marumo | A63G 31/16 434/34 |
| 10,681,081 | B2 * | 6/2020 | Hamid | H04L 63/045 |
| 10,946,292 | B1 * | 3/2021 | George | A63F 13/86 |
| 11,123,634 | B1 * | 9/2021 | Griffais | A63F 13/352 |

(Continued)

OTHER PUBLICATIONS

Kingston Technology, iPhone Tips—iOS Augmented Reality Apps and Games, youtube.com/watch?v=GWNzJ99yOOM, Jul. 27, 2018. (Year: 2018).*

(Continued)

*Primary Examiner* — Michael A Cuff
(74) *Attorney, Agent, or Firm* — KOS IP Law LLP (57) ABSTRACT

A portable electronic device may be configured for play of a video game, with user controlled game characters operated based on inputs received on first user inputs of the device and a virtual game world modified based on information from motion-related sensors of the device. The modification of the virtual game world may be rotation and/or translation of the virtual game world in a gravitational reference frame. The portable electronic device may also allow for user configuration of the virtual game world.

12 Claims, 8 Drawing Sheets

(56) References Cited

U.S. PATENT DOCUMENTS

| | | | | |
|---|---|---|---|---|
| 2009/0029754 | A1* | 1/2009 | Slocum | A63B 71/0622 |
| | | | | 463/5 |
| 2011/0037834 | A1* | 2/2011 | Hsiung | H04N 13/388 |
| | | | | 348/47 |
| 2013/0191787 | A1* | 7/2013 | Armstrong | G06F 1/1694 |
| | | | | 715/850 |
| 2014/0359663 | A1* | 12/2014 | Nakanishi | H04N 21/4183 |
| | | | | 725/37 |
| 2015/0234189 | A1* | 8/2015 | Lyons | G02B 27/0093 |
| | | | | 345/174 |
| 2016/0239080 | A1* | 8/2016 | Margolina | G06F 3/017 |
| 2017/0336882 | A1* | 11/2017 | Tome | G06F 3/0346 |
| 2018/0095634 | A1* | 4/2018 | Alexander | G06F 3/0346 |
| 2019/0156573 | A1* | 5/2019 | Palos | G06T 19/20 |
| 2019/0199688 | A1* | 6/2019 | Wallace | H04L 63/0272 |
| 2019/0236461 | A1* | 8/2019 | Wong | G06N 20/00 |
| 2020/0057828 | A1* | 2/2020 | Harrison | G06F 16/5854 |
| 2020/0078689 | A1* | 3/2020 | Eatedali | G06T 19/006 |
| 2020/0125255 | A1* | 4/2020 | Murphy | G06F 3/04883 |
| 2021/0365511 | A1* | 11/2021 | Matloub | G06F 16/9535 |

OTHER PUBLICATIONS

Soo, Justin, "Pokemon Go Will Try to Use Most of Your Mobile Device Sensor", pghack.com/tag/accelerometer/, Sep. 14, 2016. (Year: 2016).*

Nathie, "Inside the Largest Virtual Reality Theme Park in The World—VR Star Park China", https://www.youtube.com/watch?v=x7Grrfv6AP8, published Feb. 15, 2019. (Year: 2019).*

* cited by examiner

VIDEO GAME WITH MOBILE DEVICE INPUT DYNAMICS

CROSS REFERENCE TO RELATED APPLICATION

This application claims the benefit of the filing date of U.S. Provisional Patent Application No. 62/937,599, filed on Nov. 19, 2019, the disclosure of which is incorporated by reference herein.

BACKGROUND OF THE INVENTION

The present invention relates generally to video games, and more particularly to video games played on mobile devices.

Video games are enjoyed by many, often allowing video game players to virtually participate in otherwise unavailable activities. The activities may be unavailable due to requirements of skill, experience, or equipment availability, due to the activities occurring in a fantastical world, or due to inherent dangers of the activities.

Video games often may be played using devices particularly suited for use with video games. For example, video games may be played using game controllers. Some game controllers may be uniquely suited for use with a particular video game. For example a game controller resembling a musical instrument may be used for a music-based video game, and, also for example, a game controller resembling a firearm may be used in a shooting-type game. Some game controllers may be suited for use with a wide variety of video games, with the game controllers having shapes and input devices particularly suited for providing ease of control of game characters and their actions.

With the proliferation of smartphones having significant processing, display, and data communication features, players are increasingly playing video games on smartphones. However, depending on the video game, smartphones may not be particularly well adapted for play of video games.

BRIEF SUMMARY OF THE INVENTION

Some embodiments in accordance with aspects of the invention provide for play of a video game on portable electronic device having a touchscreen input device, with actions of a user controlled game character being based on inputs to the touchscreen input device and modifications to a virtual world in which the game character is located based on motion of the portable electronic device. In some embodiments the modifications to the virtual world comprise rotations of the virtual world. In some embodiments the rotations of the virtual world are with respect to a virtual gravitational field of the virtual world. In some embodiments the virtual world comprises a chamber with at least four sides, and the rotations of the virtual world rotates the chamber such that a floor of the chamber changes from one side to another side. In some embodiments play of the video game occurs on a plurality of portable electronic devices in data communication with one another. In some embodiments motion of a one of the portable electronic devices results in motion of the virtual world for all of the portable electronic devices. In some embodiments the portable electronic devices are smartphones.

Some embodiments provide a game device configured for play of a video game, comprising: a frame; a display coupled to the frame; at least one processor coupled to the frame, the least one processor configured to provide display information of a virtual world of game play and game characters in the virtual world for display by the display; a touchscreen coupled to the frame, the touchscreen configured to provide user inputs based on contact with the touchscreen; and at least one motion or orientation related sensor coupled to the frame, the at least one motion or orientation related sensor configured to provide information related to movement or orientation of the frame; wherein the at least one processor is configured by program instructions to: determine actions of a game character in the virtual world of game play based on the user inputs; and determine modifications to virtual world based on the information related to movement or orientation of the frame provided by the at least one motion or orientation related sensor. In some embodiments the modifications to the virtual world comprise rotations of the virtual world. In some embodiments the rotations of the virtual world correspond to rotations of the frame, as indicated by the information related to movement or orientation of the frame provided by the at least one motion or orientation related sensor. In some embodiments the at least one processor is configured by program instructions to determine rotations of the virtual world based on the information related to movement or orientation of the frame indicating occurrence of a predetermined rotational motion of the frame. In some embodiments the at least one processor is configured by program instructions to determine translations of the virtual world based on the information related to movement or orientation of the frame indicating occurrence of a predetermined translational motion of the frame.

Some embodiments provide a method for providing play of a video game, comprising:

displaying at least a portion of a virtual world, on a display of a portable electronic device, with at least one user controlled game character in the virtual world and having the game character perform actions responsive to inputs received by a touchscreen of the portable electronic device; and modifying at least the portion of the virtual world based on motion of the portable electronic device, the modification of the at least the portion of the virtual world comprising moving the at least the portion of the virtual world in a manner related to the motion of the portable electronic device. Some embodiments further provide for modifying at least a portion of the virtual world based on information from another portable electronic device, the information from the other portable electronic device related to motion of the other electronic device, the modification of the at least the portion of the virtual world comprising moving the at least the portion of the virtual world in a manner related to the motion of the other portable electronic device. In some embodiments the modification of the at least the portion of the virtual world comprises rotating the virtual world with respect to a virtual gravitational field applied to the virtual world. In some embodiments the at least the portion of the virtual world comprises a chamber with at least a first wall, a second wall, a third wall, and a fourth wall, with the second wall connecting first edges of the first wall and the fourth wall and with the third wall connecting second edges, opposing the first edges, of the first wall and the fourth wall. In some embodiments at any given time during which rotation of the at least the portion of the virtual world is not occurring, a one of the first wall, second wall, third wall, and fourth wall provides a floor of the chamber and another of the first wall, second wall, third wall, and fourth wall provides a ceiling of the chamber.

Some embodiments provide a non-transitory computer readable memory storing program instructions, the program instructions comprising program instructions to configure at least one processor to: display at least a portion of a virtual world on a display, with at least one user controlled game character in the virtual world and having the game character perform actions responsive to inputs received by at least one input device; and modify at least the portion of the virtual world based on motion of a device including the display and the at least one input device, the modification of the at least the portion of the virtual world comprising moving the at least the portion of the virtual world in a manner related to the motion of device.

These and other aspects of the invention are more fully comprehended upon review of this disclosure.

DETAILED DESCRIPTION

Figure 1:
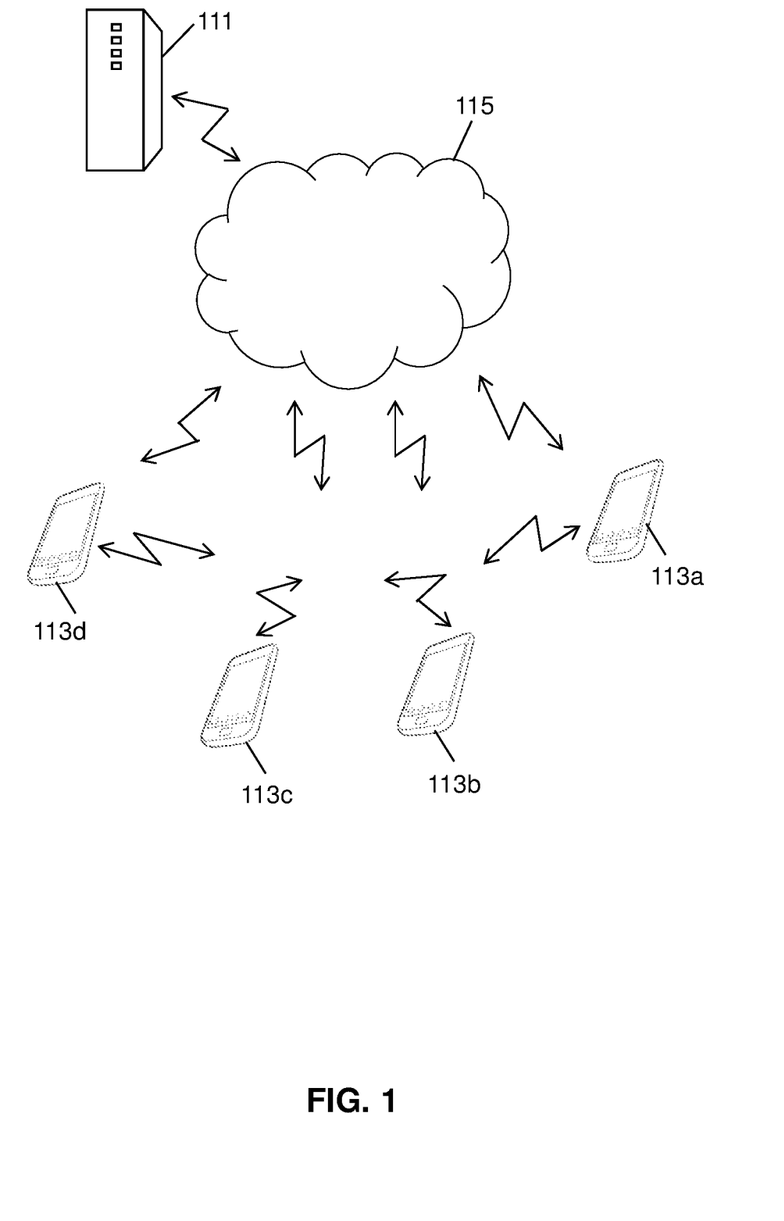
FIG. 1 is a semi-block diagram of a networked system in accordance with aspects of the invention.

FIG. 1 is a semi-block diagram of a networked system in accordance with aspects of the invention. The networked system includes a server 111 and a plurality of portable electronic devices 113a-d communicatively coupled to each other by a network 115, which may be the Internet. The portable electronic devices are also in data communication with one another, and in some embodiments may form a local network. In some embodiments the local network may also include a router or hub.

The portable electronic devices provide for play of a video game. In some embodiments the portable electronic devices each provide for play of their own stand-alone game, in some embodiments the portable electronic devices provide for networked play of a common game. In some embodiments the portable electronic devices provide for control of a user controlled game character, based on user inputs to the devices, in a virtual world of game play. In addition, the portable electronic devices provide for modification of the virtual world based on motion of the devices.

In some embodiments the modification of the virtual world comprises a rotation of the virtual world. In some embodiments the modification of the virtual comprises a translation of the virtual world. In some embodiments the rotation and/or translation of the virtual world is with respect to a virtual gravitational field of the virtual world. In some embodiments the virtual world comprises a chamber, which may be rotated and/or translated. In some embodiments the chamber includes a plurality of walls, with, when the chamber is not being rotated, a one of the walls providing a floor of the chamber and another of the walls providing a ceiling of the chamber.

The portable electronic devices each include at least one processor, a display, at least one user input device, at least one motion-related sensor, and in various embodiments communication circuitry, generally all coupled to a frame or bounds of a frame. In some embodiments the at least one user input device comprises a touchscreen. In some embodiments the at least one motion-related sensor comprises at least one accelerometer, with many embodiments including a plurality of accelerometers, in some embodiments the at least one motion related sensor comprises at least one gyroscope, and in some embodiments the at least one motion related sensor comprises both accelerometer(s) and gyroscope(s). In some embodiments the processor, for example as configured by program instructions, determines actions of user controlled game characters in the virtual world based on inputs received by the touchscreen and commands display of the virtual world, or portions of the virtual world, on the display. The processor also commands rotations and/or translations of the virtual world, or portions of the virtual world including the game characters, based on information from the at least one motion-related sensor, in some embodiments, and based on information generated by a processor of another portable electronic device (and based on information from the at least one motion-related sensor of that other portable electronic device) in some embodiments.

In some embodiments the processor is also configured to allow one or more game players to determine objects and items in the virtual world. In some embodiments the processor is configured to place virtual items in the virtual world, with the items and their placement indicated by way of user inputs received by the touchscreen. In some embodiments the virtual world includes a chamber with a plurality of sides, and each player in a multi-player game is provided control over selection and placement of items for a corresponding one of the plurality of sides.

In multi-player game play, for example, each of a plurality of portable electronic devices may display a common virtual game world, with a user controlled game character for each of the portable electronic devices in the virtual game world. In some embodiments portable electronic devices may communicate directly with one another, or through a local router, in providing multi-player game play. In some embodiments the portable electronic devices may communicate through the server 111, which may be remote from the portable electronic devices, which also may be remote from one another. In some embodiments the server may also provide program instructions for game play to the portable electronic devices, provide information regarding virtual items which may be placed in the virtual world, and/or provide other information or functions ancillary to play of the video game.

FIGS. 2A-D and FIGS. 3A-D illustrate aspects of screenshots of a video game on different portable electronic devices before and after an example modification of a virtual world of a video game in accordance with aspects of the invention. In general, the screenshots show modification of a virtual game world due to rotation of one of the portable electronic devices. In the example of FIGS. 2A-D and 3A-D, the modification of the virtual game world is a rotation of the virtual game world, for example with respect to a virtual gravitational field applied to the virtual game world. For FIGS. 2A-D, the rotation of the virtual world is due to a partial rotation or "flick" of a portable electronic device, with display of the virtual world also rotating with respect to the device. The "flick" of the portable electronic device may be, for example, a sudden rotation of the portable electronic device, for example by 45 degrees, with the device quickly counter-rotated to its initial position. For FIGS. 3A-D, the rotation of the virtual world corresponds to rotation of a portable electronic device, with display of the virtual world not rotating with respect to the rotated device.

The screenshots of FIGS. 2A-D and 3A-D only illustrate aspects of what might be displayed on the devices, and may illustrate only portions of what might be displayed on a display of the devices. The screenshots shown in FIGS. 2A, 2B may be screenshots at a first time from a first portable electronic device and a second electronic portable device, respectively, and the screenshots shown in FIGS. 3A, 3B may be screenshots at a first time from a first portable electronic device and a second electronic portable device, respectively. The screenshots shown in FIGS. 2C and 2D may be screenshots at a subsequent time from the first portable electronic device and the second portable electronic device, respectively, and FIGS. 3C and 3D similarly showing screenshots at a subsequent time from the first portable electronic device and the second portable electronic device, respectively. The portable electronic devices may be portable electronic devices such as discussed with respect to the system of FIG. 1, for example, and in some embodiments the portable electronic devices may be smartphones.

Figure 2A:
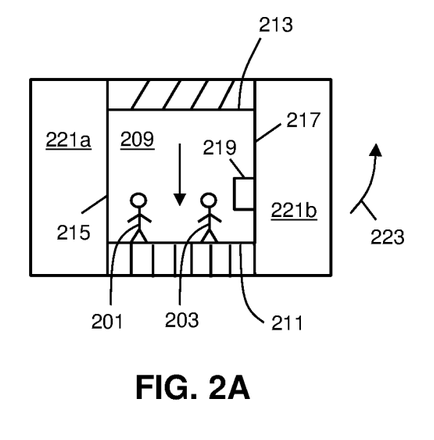
FIGS. 2A-D illustrate aspects of screenshots of a video game on different devices before and after an example rotation of a virtual world of a video game in accordance with aspects of the invention.
Figure 2B:
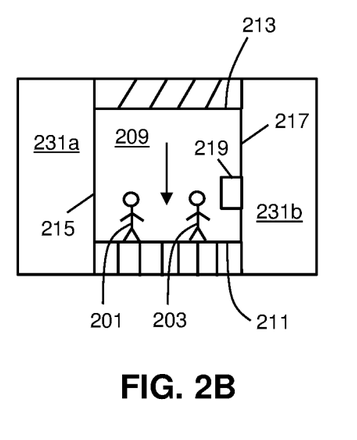

The screenshot of FIGS. 2A and 2B show a virtual game world in the form of a chamber or room, with the chamber or room open to the viewer. The chamber includes five walls 209, 211, 213, and 215. In FIGS. 2A and 2B the chamber is orientated such that the wall 211 provides a floor of the chamber, the wall 213 provides a ceiling of the chamber, walls 215 and 217 connect opposite edges of the floor and ceiling, and wall 209 provides a rear or back wall of the chamber. A front of the chamber may be considered as either being open, or simply not viewable or part of a play area of the virtual world. The walls of the chamber may be furnished with various items related to play of the video game. In FIGS. 2A and 2B, an item 219 is shown on the wall. The item may be an object to be attained by user controlled game characters, or provide some other function. In various embodiments each wall of the chamber may include one, a plurality, or no such items. For FIGS. 2A and 2B the item 219 is primarily illustrated for ease in visually identifying relative positions of the walls.

A first game character 201 and a second game character 203 are shown within the chamber. In FIGS. 2A and 2B the game characters are shown standing on the wall 211 providing the floor of the chamber (in FIGS. 2A and 2B). The game characters may be user controlled game characters, with for example the first game character controllable using the device for FIG. 2A and the second game character controllable using the device for FIG. 2B. In some embodiments the game characters may be controlled using areas of a touch screen away from the display of the chamber. For example, in some embodiments, for the device of FIG. 2A touchscreen areas 221a and/or 221b, arranged on opposing sides of the displayed chamber, may be used to control the first game character, with similarly arranged touchscreen areas 231a and 231b available for use for the device of FIG. 2B. In other embodiments, however, other areas of the touchscreen, including areas displaying the chamber, may be used for controlling actions of game characters.

An arrow 223 is shown to the side of FIG. 2A. The arrow, on the same side of the screen as the wall 217, is shown pointing upward, with a slight inward rotation. The arrow indicates a partial counter clockwise rotation of a device including the screen, as viewed looking toward the display screen of the device. In some embodiments the device is configured to determine the device is being rotated, with rotation of the device resulting in a change to the virtual world, for example as discussed with respect to FIGS. 2C and 2D. In some embodiments the device includes at least one gyroscope, for example a MEMS gyroscope and/or at least one accelerometer, for use in determining rotation of the device. The gyroscope and accelerometer may be considered a motion-related related sensor. In some embodiments the motion related sensor indicates rate of angular rotation of the device about an axis extending though a plane defined by the display of the device (for example an axis extending into the page, for FIGS. 2A-D). In some embodiments such may be considered as indicating yaw of the device. In some embodiments the motion related sensor indicates rate of angular rotation of the device about an axis extending though a plane vertically bisecting the display of the device (for example an axis extending vertically in the page, for FIGS. 2A-D). In some embodiments such may be considered as indicating pitch of the device. In some embodiments the motion related sensor indicates rate of angular rotation of the device about an axis extending though a plane horizontally bisecting the display of the device (for example an axis extending horizontally in the page, for FIGS. 2A-D). In some embodiments such may be considered as indicating roll of the device. In some embodiments the motion-related sensor indicates orientation of the device.

Figure 2C:
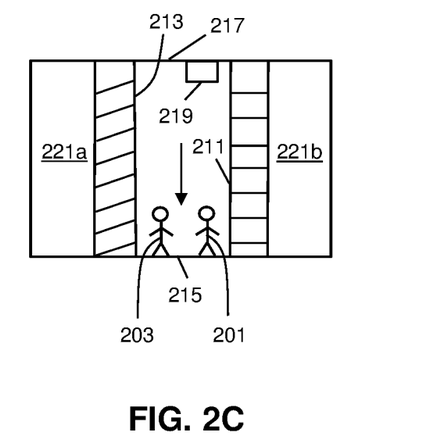
Figure 2D:
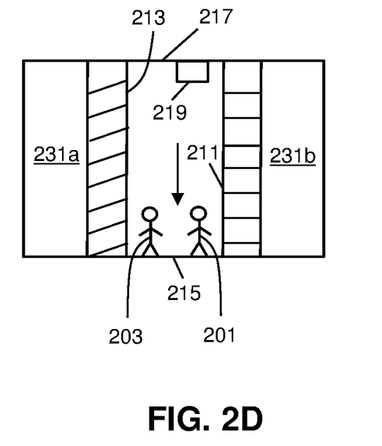

In response to rotation of the device for FIG. 2A, the virtual world is also rotated, both for the device for FIG. 2A and the device for FIG. 2B. FIGS. 2C and 2D show the virtual game world of FIGS. 2A and 2B, but with the virtual game world rotated ninety degrees in a counter clockwise in FIGS. 2C and 2D, as compared to orientation of the virtual game world shown in FIGS. 2A and 2B.

As may be seen from a comparison of FIGS. 2A and 2C, and of FIGS. 2B and 2C, the wall 217 provides a ceiling of the chamber in FIGS. 2C and 2D, while the wall 215 provides a floor of the chamber. For convenience, an arrow showing a direction of gravity in the virtual game world is indicated in the chamber, pointing to the wall 211 in FIGS. 2A and 2B, and pointing to the wall 215 in FIGS. 2C and 2D. The virtual game world may therefore be considered to have been rotated by 90 degrees with respect to a gravitational field of the virtual game world. In some embodiments the chamber shown in FIGS. 2A-D may be considered to exist in some larger space (for example a larger building or other structure), with the chamber have been itself rotated within what may be considered that larger space.

In some embodiments items not affixed to the various walls may show effects of the rotation of the chamber. For example, the game characters 201 and 203 may fall from the wall 211 (serving as the floor in FIGS. 2A and 2B) to the wall 215 (serving as the floor in FIGS. 2C and 2D) due to the rotation of the chamber. Moreover, and as may be seen by comparing FIGS. 2A-B with FIGS. 2C-D, relative positions of the game characters may change due to the rotation.

Figure 3A:
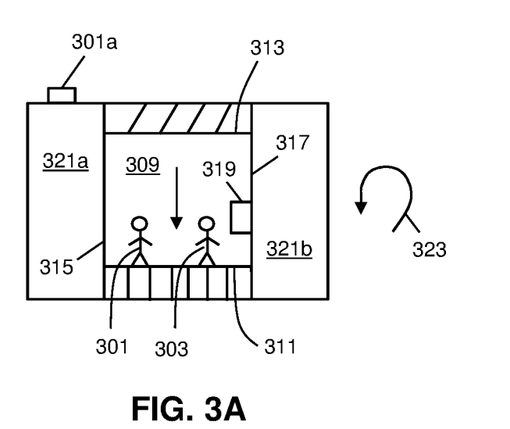
FIGS. 3A-D illustrate aspects of screenshots of a video game on different devices before and after a further example rotation of a virtual world of a video game in accordance with aspects of the invention.
Figure 3B:
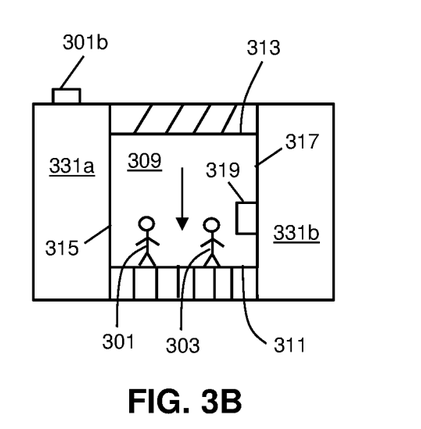
Figure 3C:
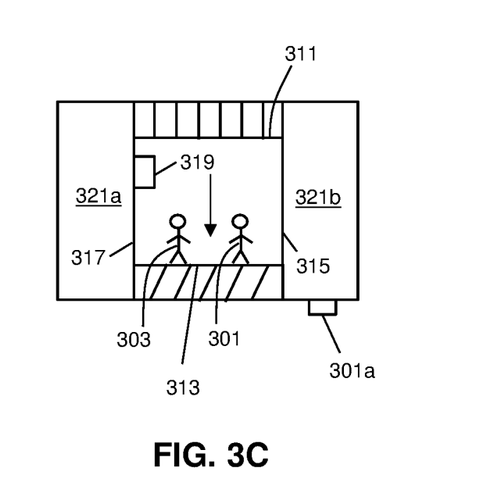
Figure 3D:
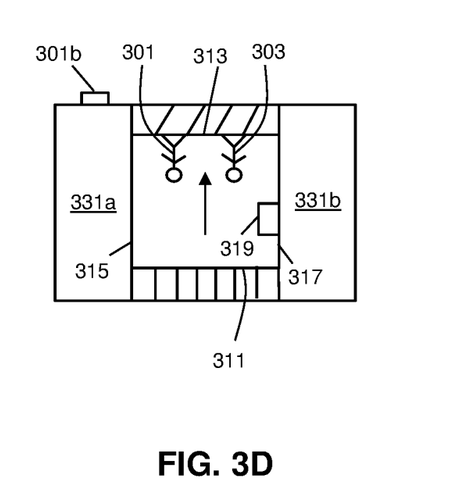

FIGS. 3A-D similarly illustrate aspects of screenshots of a video game on different devices before and after a further example rotation of a virtual world of a video game in accordance with aspects of the invention. As with FIGS. 2A-D, FIGS. 3A and 3B show screenshots of first and second portable electronic devices, respectively, prior to a rotation event, and FIGS. 3C and 3D show screenshots of the first and second portable electronic devices, respectively, after the rotation event. The example of FIGS. 3A-D may be considered to differ from that of FIGS. 2A-D in that the rotation event is triggered not by a "flick" of one of the portable electronic devices, but instead a rotation of one of the portable electronic devices, with the portable electronic device rotated to a new position and held in that position. For example, in some embodiments the rotation may be in any of 90 degree increments, with the example of FIGS. 3A-D illustrating a rotation of a portable device by 180 degrees.

Similar to FIGS. 2A-D, FIGS. 3A-D show a chamber that includes five walls 309, 311, 313, and 315. In FIGS. 3A and 3B the chamber is orientated such that the wall 311 provides a floor of the chamber, the wall 313 provides a ceiling of the chamber, walls 315 and 317 connect opposite edges of the floor and ceiling, and wall 309 provides a rear or back wall of the chamber. A front of the chamber may be considered as either being open, or simply not viewable or part of a play area of the virtual world. First and second user controlled game characters 301 and 303 are shown as standing on the wall 311 providing the floor, and an item 319 is affixed to wall 317. Areas 321a,b of the display of the first device may be touch sensitive (along with the entirety of the display) with inputs from areas 321a,b providing for control of the first game character 301, and corresponding areas 323a,b of the display of the second device providing for control of the second game character.

An arrow 323 alongside FIG. 3A indicates a rotation of the first portable electronic device. So that rotation of the first portable electronic device may be more easily seen, a button 301a is positioned on what may be considered an edge of the device. In FIG. 3A the button is shown on an upper side of the device, towards a left edge of the device. In FIG. 3C, which shows the first portable electronic device after rotation, the button 301a is shown on a then bottom side of the device, and towards a right edge. FIG. 3C, therefore, indicates that the first portable electronic device has been rotated 180 degrees. A similar button 301b is shown for the second portable electronic device. The button 301b is in the same position on the second portable device for both FIGS. 3B and 3D, indicating the second portable device has not been rotated.

FIGS. 3C and 3D show screenshots after rotation of the first portable electronic device. In FIGS. 3C and 3D, a floor of the chamber is provided by the wall 313, which was the ceiling in FIGS. 3A and 3B. Similarly, a ceiling is provided by the wall 311 in FIGS. 3C and 3D, which was the floor in FIGS. 3A and 3B. As with the other figures, in FIGS. 3C and 3D the game characters 301 and 303 are shown as standing on the wall then providing the floor, namely wall 313.

For both the first portable electronic device and the second portable electronic device, display of the chamber is the same, with respect to the devices, both before and after rotation of the first portable electronic device. For example, in all of FIGS. 3A-D, the wall 313 is shown as being displayed closest to the side of the device with the button. Accordingly, the rotated first electronic portable device shows the game characters standing on a "floor" below a "ceiling," in accordance with a direction of gravity for the chamber, illustrated as an arrow within the chamber. For the second portable device, however, the game characters may be viewed as standing upside down, also in accordance with the direction of gravity for the chamber, with the floor being towards what may be considered a top of the display and the ceiling being towards the bottom of the display. Such a situation may increase difficulty of play for a player using the second portable electronic device, at least until the second portable is rotated in a manner similar to the first portable electronic device. In some embodiments such a subsequent rotation may not cause a further rotation of the virtual game world, in other embodiments each rotation of a device may cause rotation of the virtual game world, and in still other embodiments only rotation of a predetermined device may cause rotation of the virtual game world.

Figure 4A:
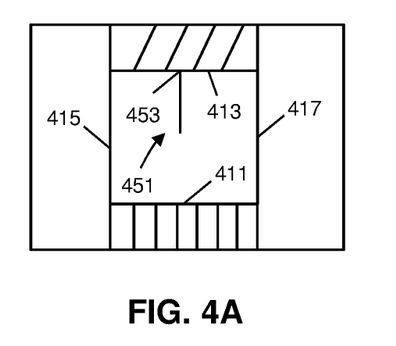
FIGS. 4A-B illustrate aspects of screenshots of a video game on different devices before and after an example translational motion of a virtual world of a video game in accordance with aspects of the invention.
Figure 4B:
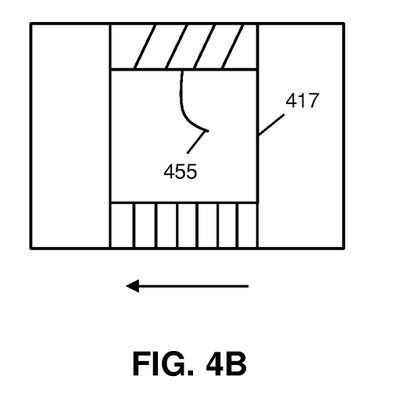

FIGS. 4A-B illustrate aspects of screenshots of a video game on different devices before and after an example translational motion of a virtual world of a video game in accordance with aspects of the invention. FIGS. 4A-B, like FIGS. 2A-D and FIGS. 3A-D, show a playable area of a virtual game world in the form of a chamber. As shown in FIG. 4A, the chamber comprises a floor 411, a ceiling 413, and side walls 415, 417 connecting outer opposing edges of the floor and the ceiling. In some embodiments the chamber may be rotated, for example as discussed with respect to FIGS. 2A-D and/or FIGS. 3A-D.

Also shown in FIG. 4A is a rope 451. A first end 453 of the rope is coupled to the ceiling. The rope extends generally straight down from the ceiling, towards the floor of the chamber. The rope therefore hangs from the ceiling, at least with the chamber orientated in a virtual gravitational field indicated by the relative position of the floor and ceiling. In various embodiments user controlled game characters (not shown in FIGS. 4A-B) may make use of the rope, for example to climb to the ceiling or to use in other manners.

In some embodiments the virtual game world may be modified by effecting discrete linear movements of the playable area of the virtual game world. The discrete linear movements may, in various embodiments, be considered to include an acceleration in a first direction, with a subsequent deceleration in that direction, for example to return the playable area to a state of rest. In some embodiments the acceleration, deceleration, and state of rest may be considered with respect to a virtual gravitational field. In some embodiments display of the virtual game world on a display device may not linearly translate across the display device, with instead effects of the linear translation affecting the virtual game world displayed on the display device.

In some embodiments the linear movements of the playable area of the virtual world are triggered by discrete linear motion of a portable electronic device which provides for play of a video game including the virtual world. In some embodiments the discrete linear motion of the portable electronic device may be, for example, discrete linear motion in a predetermined direction. In some embodiments occurrence of the linear motion of the portable electronic device may be determined based on information from one or more motion related sensors of the portable electronic device. For example, in some embodiments discrete linear motion of the virtual game world may be triggered by an accelerometer of the portable electronic device indicating motion in a predetermined direction, in some embodiments with an acceleration greater than a predetermined magnitude.

FIG. 4B illustrates an effect of discrete linear motion for the chamber of FIG. 4A. In FIG. 4B the rope no longer hangs straight down from the ceiling. Instead, an end 455 of the rope away from the ceiling is displaced towards one of the walls, wall 417 as illustrated in FIG. 4B. A movement of the rope from the position shown in FIG. 4A to the position shown in FIG. 4B would be expected, for example, if the chamber were suddenly displaced to the left in a reference frame. In such a situation, the end 453 of the rope coupled to the ceiling would displace to the left with the ceiling, but the end 455 of the rope, hanging free, would remain stationary in the reference frame.

Ability to displace, or translate, the virtual game world may provide for various aspects of game play. For example, displacing the virtual game world as indicated in FIGS. 4A-B may allow a game character to swing on the rope, possibly so as to be able to reach an item that may be on the wall 417.

Figure 5:
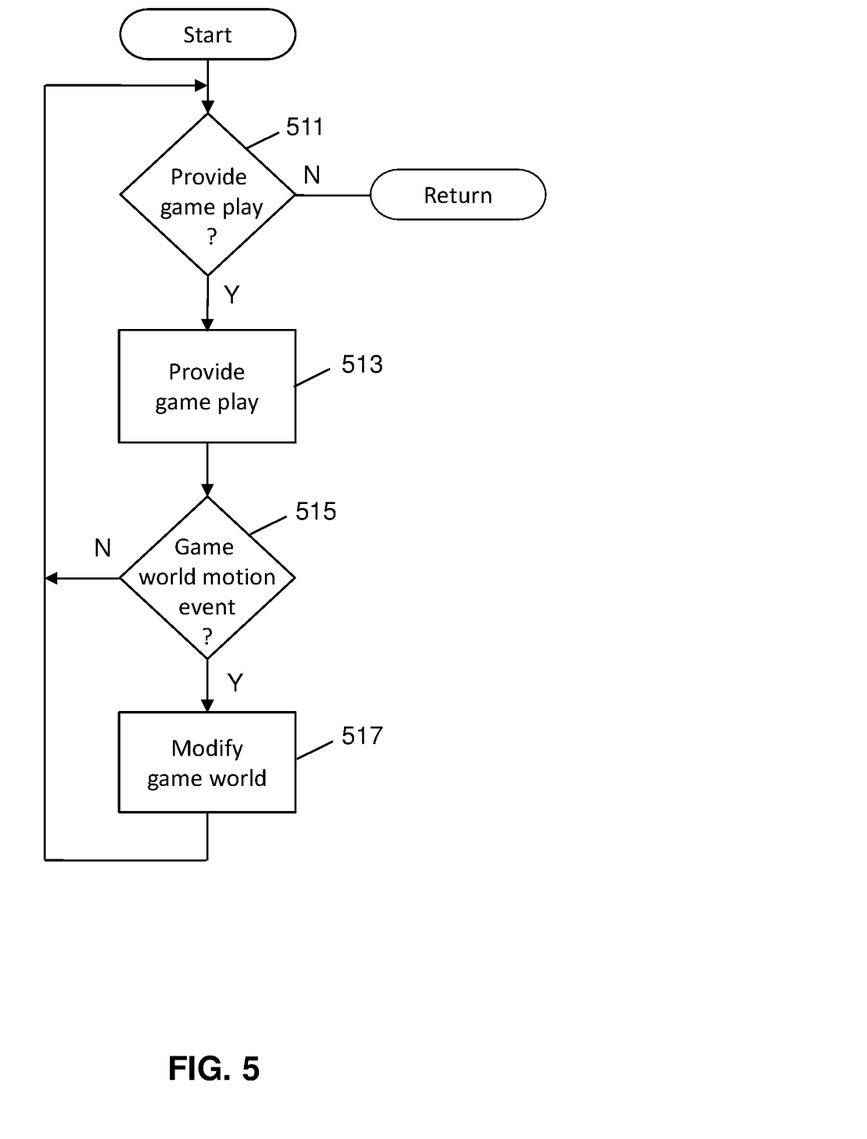
FIG. 5 is a flow diagram of a process for providing for video game play including modification of a video game virtual world based on device motion in accordance with aspects of the invention.

FIG. 5 is a flow diagram of a process for providing for video game play including modification of a video game virtual world based on device motion in accordance with aspects of the invention. In some embodiments the process of FIG. 5 is performed by a system, for example the system of FIG. 1. In some embodiments the process is performed by one or more portable electronic devices, for example one or more of the portable electronic devices of FIG. 1. In some embodiments the process performs functions including functions discussed with respect to FIGS. 2A-D, 3A-D, and/or 4A-B. In some embodiments the process is performed by at least one processor, for example as configured by program instructions.

In block 511, the process determines if game play should be provided. If not, the process returns. Otherwise the process continues to block 513.

In block 513 the process provides for game play of a video game. In some embodiments game play of the video game includes displaying a user controlled game character in a virtual world of game play, with the user controlled game character moving and interacting with the virtual world, including other game characters, in accordance with inputs received from user input devices. In some embodiments user input devices for control of the user controlled game character is a touchscreen. In some embodiments a plurality of players may play the video game, with a user controlled game character for each of the players. In some embodiments game play is performed using a single game play device, for example a single portable electronic device. In some embodiments game play is performed using multiple game play devices, for example including a portable electronic device for each players.

In block 515 the process determines if a game world motion event has occurred. In many embodiments the operation(s) of block 515 (and later discussed block 517) are themselves part of providing for game play of the video game. For ease of discussion, however, operations of blocks 515 and 517 are discussed separate from the discussion of block 513.

In some embodiments the process determines if a game world motion event has occurred if a motion-related sensor of the portable electronic device, or one of them, indicates the portable electronic device has been moved in a predetermined manner. In some embodiments the motion-related sensor is at least one accelerometer and/or at least one gyroscope of the portable electronic device indicates that the portable electronic device has been moved in a predetermined manner. In some embodiments the portable electronic device has been moved in a predetermined manner if the motion-related sensor indicates that the portable electronic device has been rotated about an axis normal to a display of the portable electronic device, a rotation that may be considered a yaw rotation or a rotation in the yaw direction. In some embodiments the motion-related sensor indicates that the portable electronic device has been rotated if the motion-related sensor indicates a yaw rotation with an angular velocity greater than a predetermined magnitude. In some embodiments the motion-related sensor indicates that the portable electronic device has been rotated if the motion-related sensor indicates a yaw rotation with an angular velocity within a predetermined range of angular velocities. In some embodiments the angular velocity additionally is to occur over a predetermined period of time. In some embodiments the motion-related sensor indicates that the portable electronic device has been rotated if the motion-related sensor indicates a yaw rotation with an amount of rotation greater than a predetermined amount, for example greater than 45 degrees in some embodiments, or greater than 60 degrees in some embodiments, or greater than 75 degrees in some embodiments. In some embodiments the motion-related sensor indicates that the portable electronic device has been rotated if the motion-related sensor indicates a yaw rotation with an angular velocity greater than a predetermined magnitude and a yaw rotation greater than a predetermined amount. In some embodiments the portable electronic device has been moved in a predetermined manner if the motion-related sensor indicates that the portable electronic device has been linearly translated, or linearly displaced. In some embodiments the linear translation is to be in a predetermined direction. In some embodiments the linear translation is to be over a predetermined distance. In some embodiments the linear translation is to be at a velocity greater than a predetermined velocity, or to include an acceleration greater than a predetermined acceleration.

If the process determines that a game world motion event has occurred, the process proceeds to block 517. Otherwise the process returns to block 511.

In block 517 the process modifies the virtual game world, or a portion of the virtual game world, in response to occurrence of the game world motion event. In some embodiments the process modifies the virtual game world by rotating the virtual game world, or a portion of the virtual game world. In some embodiments the rotation is of a predetermined amount. In some embodiments the rotation is of a predetermined amount, and in a direction corresponding to a direction of motion of the portable electronic device giving rise to the game world motion event. In some embodiments the predetermined amount is a rotation of ninety degrees. In some embodiments the predetermined amount is 360 degrees divided by a number of walls of the virtual world that may serve as floors. In some embodiments the rotation is an amount of rotation corresponding to rotation of the portable electronic device giving rise to the game world motion event. In some embodiments the rotation is with respect to a virtual gravitational field for the virtual game world. In some embodiments the rotation is in accordance with or as discussed with respect to FIGS. 2A-D. In some embodiments the rotation is in accordance with or as discussed with respect to FIGS. 3A-D. In some embodiments the process modifies the virtual game world by displacing the virtual game world, or a portion of the virtual game world, by a predetermined amount. In some embodiments the displacement of the virtual game world, or a portion of the virtual game world, occurs within a virtual gravitational field for the virtual game world. In some embodiments the displacement is with respect to a reference frame for the virtual game world. In some embodiments the displacement is in a direction of motion of the portable electronic device giving rise to the game world motion event.

The process thereafter returns to block 511.

Figure 6:
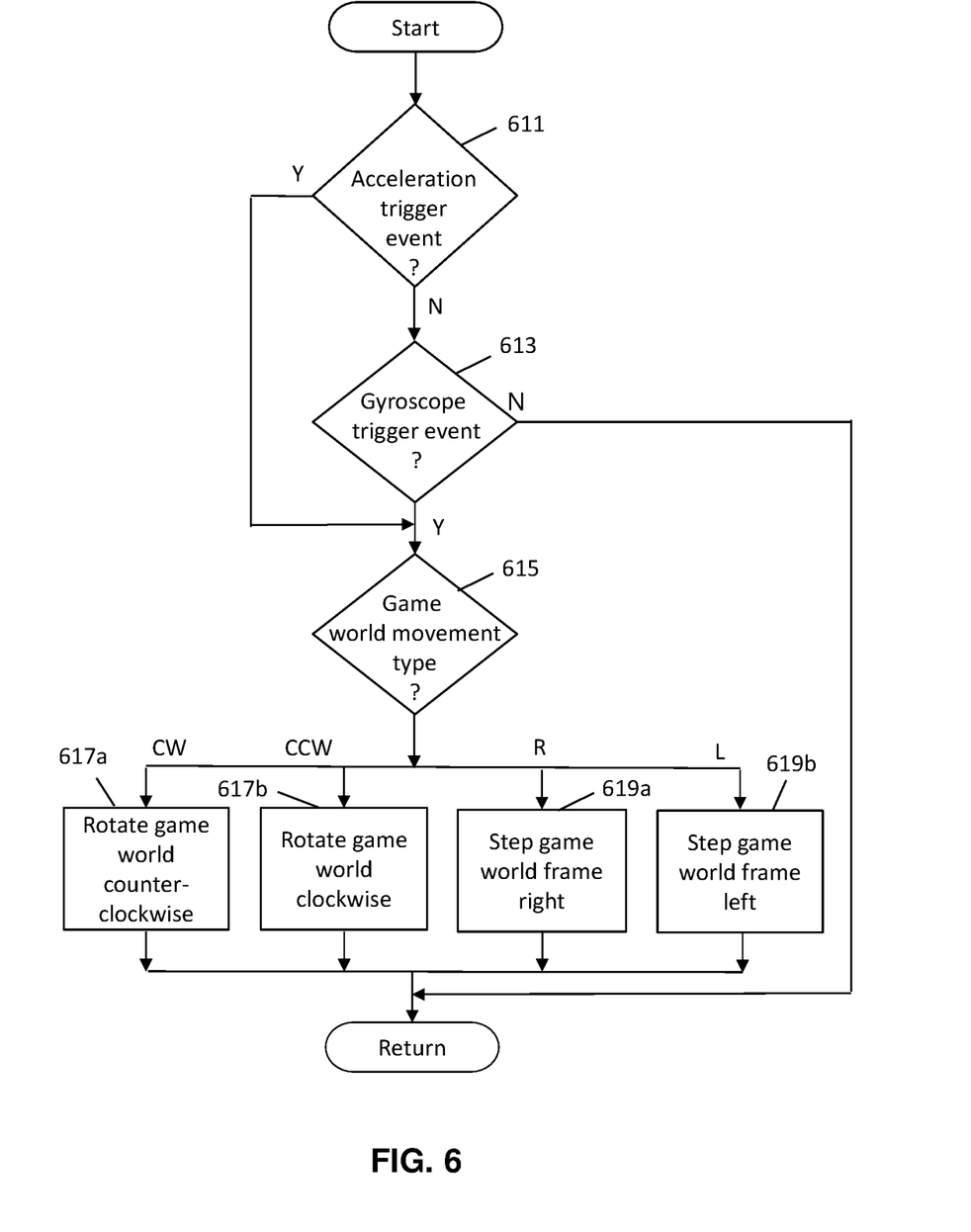
FIG. 6 is a flow diagram of a process for providing for modification of a video game virtual world based on device motion in accordance with aspects of the invention.

FIG. 6 is a flow diagram of a process for providing for modification of a video game virtual world based on device motion in accordance with aspects of the invention. In some embodiments the process of FIG. 6 is performed by a system, for example the system of FIG. 1. In some embodiments the process is performed by one or more portable electronic devices, for example one or more of the portable electronic devices of FIG. 1. In some embodiments the process performs functions including functions discussed with respect to FIGS. 2A-D, 3A-D, and/or 4A-B. In some embodiments the process is performed by at least one processor, for example as configured by program instructions. In some embodiments the process performs operations of blocks 515 and 517 of the process of FIG. 5.

In some embodiments the process modifies the virtual game world by moving a chamber of a virtual game world. In some embodiments the virtual game world is modified by rotating the virtual game world in a clockwise or a counterclockwise direction. In some embodiments the virtual game world is modified by stepping a frame of the virtual game world left or right. In some embodiments the virtual game world is modified in response to occurrence of an acceleration trigger event or a gyroscope trigger event. In some embodiments the acceleration trigger event or gyroscope trigger event is based on information from at least one motion-related sensor of a portable electronic device. In some embodiments the at least one motion-related sensor comprises at least one accelerometer, with some embodiments including a plurality of accelerometers. In some embodiments the at least one motion related sensor comprises at least one gyroscope. In some embodiments the at least one motion related sensor comprises both accelerometer(s) and gyroscope(s).

In block 611 the process determines if an acceleration trigger event has occurred. In some embodiments process determines that an acceleration trigger event has occurred based on information from at least one accelerometer. In some embodiments the at least one accelerometer is in a frame of a portable electronic device. In some embodiments the portable electronic device is a portable electronic device of FIG. 1. In some embodiments an acceleration trigger event occurs when the portable electronic device is moved in a predetermined manner, as indicated by the at least one accelerometer. In some embodiments the requisite movement is yawing the portable electronic device at a requisite degree range and with a requisite acceleration range. In some embodiments a change in yaw is measured by a change of 15 degrees to 75 degrees within a predetermined time period. In some embodiments the change in yaw is measured by a rate of change greater than a predetermined magnitude within a predetermined time period. In some embodiments the requisite movement is translation of the portable electronic device linearly along at least a predetermined distance with a requisite acceleration range. In some of such embodiments the linear translation is to the right of an initial position. In some of such embodiments the linear translation is to the left of the initial position.

If an acceleration trigger event has occurred, the process proceeds to block 615. Otherwise the process continues to block 613.

In block 613 the process determines if a gyroscope trigger event has occurred. In some embodiments process determines that a gyroscope trigger event has occurred based on information from at least one gyroscope. In some embodiments the at least one gyroscope is in a frame of a portable electronic device. In some embodiments the portable electronic device is a portable electronic device of FIG. 1. In some embodiments a gyroscope trigger event occurs when the portable electronic device is moved in a predetermined manner, as indicated by the at least one gyroscope. In some embodiments the requisite movement is yawing the portable electronic device. In some embodiments the yawing of the portable electronic device is rotation of the portable electronic device by a predetermined number of degrees, or within a predetermined range of a predetermined number of degrees. In some embodiments the predetermined number of degrees is in increments of 360 degrees divided by x, x being a number of "walls" of the chamber of the virtual game world that may serve as a floor in the virtual game world. In some embodiments the requisite yaw has a magnitude of 180 degrees. In some embodiments the requisite yaw has a magnitude of 90 degrees. In some of such embodiments the yaw is in either a clockwise direction or a counterclockwise direction.

If a gyroscope trigger event has occurred, the process continues to block 615. Otherwise the process returns.

In block 615 the process determines a virtual game world movement type. In some embodiments the virtual game world movement type is a counter-clockwise rotation. In some embodiments the virtual game world movement type is a clockwise rotation. In some embodiments the virtual game world movement type is lateral movement of the virtual game world to the right. In some embodiments the virtual game world movement type is lateral movement of the virtual game world to the left.

In some embodiments the process determines the virtual game world movement type is a counter-clockwise rotation if information from the accelerometer and/or the gyroscope indicates the portable electronic device has undergone a counter-clockwise rotation. In some embodiments the process determines the virtual game world movement type is a clockwise rotation if information from the accelerometer and/or the gyroscope indicates the portable electronic device has undergone a clockwise rotation. In some embodiments the process determines the virtual game world movement type is a lateral movement of the virtual game world to the right if information from the accelerometer and/or the gyroscope indicates the portable electronic device has been translated to the right, for example as viewed from a viewpoint in front of a display of the portable electronic device. In some embodiments the process determines the virtual game world movement type is a lateral movement of the virtual game world to the left if information from the accelerometer and/or the gyroscope indicates the portable electronic device has been translated to the left, for example as viewed from the viewpoint in front of the display of the portable electronic device.

If the virtual game world movement type is a counter-clockwise rotation, the process proceeds to block 617*a*. If the virtual game world movement type is a clockwise rotation, the process proceeds to block 617*b*. If the virtual game world movement type is a lateral movement of the virtual game world to the right, the process proceeds to block 619*a*. If the virtual game world movement type is a lateral movement of the virtual game world to the left, the process proceeds to block 619*b*.

In block 617*a* the process rotates the virtual game world counterclockwise. In some embodiments the virtual game world is a chamber defined by an initial floor, initial ceiling, an initial left wall, and an initial right wall prior to the process. Following the counterclockwise rotation of the virtual game world, the initial left wall takes the place of the initial floor and becomes the new floor, the initial ceiling takes the place of the initial left wall and becomes the new left wall, the initial right wall takes the place of the initial ceiling and becomes the new ceiling, and the initial floor takes the place of the initial right wall and becomes the new right wall. In some embodiments, a virtual game world gravity perpetually exerts a force in a direction toward the floor, and following the counterclockwise rotation of the virtual game world, the virtual game world gravity pulls game characters and floating game objects to the new floor or the initial left wall.

The process thereafter returns.

In block 617b the process rotates the virtual game world clockwise. In some embodiments the virtual game world is a chamber defined by an initial floor, initial ceiling, an initial left wall, and an initial right wall prior to the process. Following the clockwise rotation of the virtual game world, the initial right wall takes the place of the initial floor and becomes the new floor, the initial floor takes the place of the initial left wall and becomes the new left wall, the initial left wall takes the place of the initial ceiling and becomes the new ceiling, and the initial ceiling takes the place of the initial right wall and becomes the new right wall. In some embodiments, a virtual game world gravity perpetually exerts a force in a direction toward the floor, and following the clockwise rotation of the virtual game world, the virtual game world gravity pulls game characters and floating game objects to the new floor or the initial right wall.

The process thereafter returns.

In block 619a the process steps the virtual game world frame to the right of an initial virtual game world frame position. In some embodiments the virtual game world frame accelerates or deaccelerates during a linear translation to the right of the initial virtual game world frame position and floating or partially floating game object(s) and game character(s) in the virtual game world react to the acceleration or deceleration of the virtual game world frame. In some embodiments the reaction is a linear translation to the left.

The process thereafter returns.

In block 619b the process steps the virtual game world frame to the left of an initial virtual game world frame position. In some embodiments the virtual game world frame accelerates or deaccelerates during a linear translation to the left of the initial virtual game world frame position and floating or partially floating game object(s) and game character(s) in the virtual game world react to the acceleration or deceleration of the virtual game world frame by linearly translating to the right of their respective initial positions. For example, the virtual game world frame of the portable electronic device of FIG. 4A is stepped to the left in FIG. 4B and the partially floating game object of FIG. 4A, which is a rope for example, reacts to the stepping to the left of the virtual game world frame in FIG. 4B by linearly translating to the right of what may be considered the rope's initial position in FIG. 4A.

The process thereafter returns.

Figure 7:
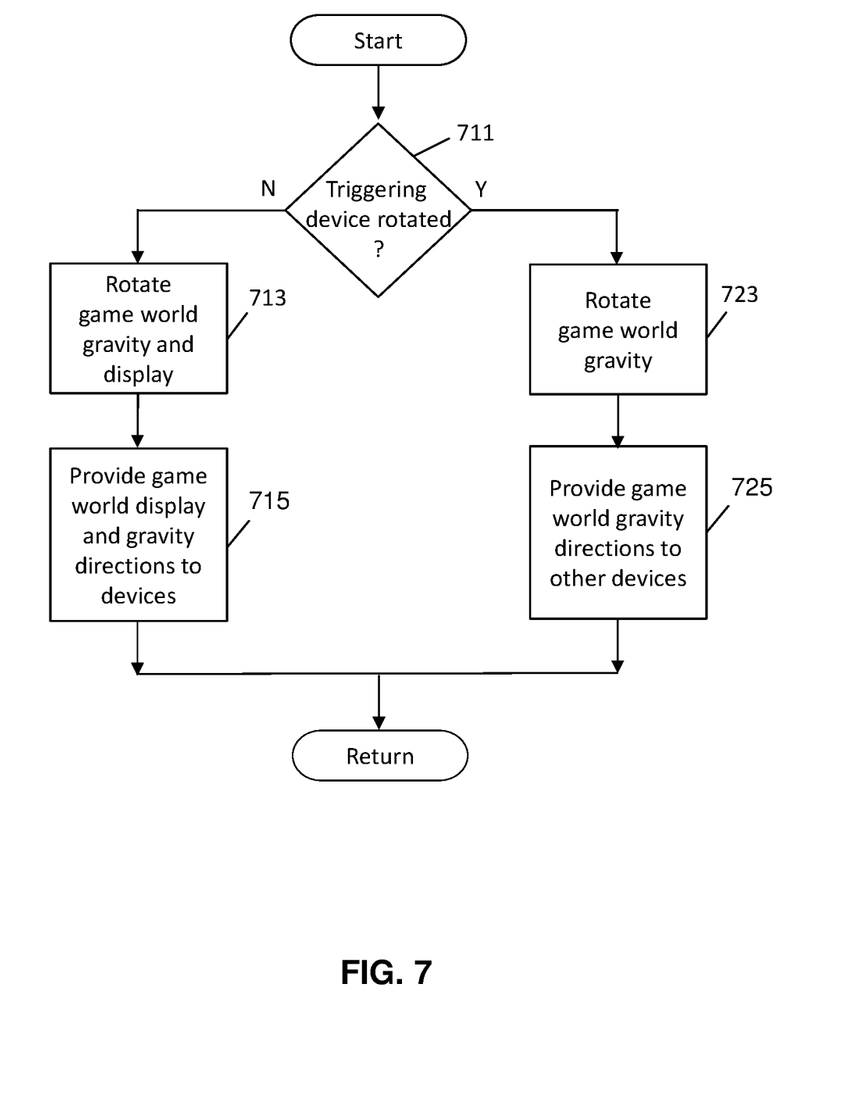
FIG. 7 is a flow diagram of a process for providing for rotation of a video game virtual world based on device motion in accordance with aspects of the invention.

FIG. 7 is a flow diagram of a process for providing for rotation of a video game virtual world based on device motion in accordance with aspects of the invention. In some embodiments the process of FIG. 7 is performed by a system, for example the system of FIG. 1. In some embodiments the process is performed by one or more portable electronic devices, for example one or more of the portable electronic devices of FIG. 1. In some embodiments the process performs functions including functions discussed with respect to FIGS. 2A-D and/or 3A-D. In some embodiments the process is performed by at least one processor, for example as configured by program instructions. In some embodiments the process performs operations of blocks 517 of the process of FIG. 5. In some embodiments the process performs operations of blocks 617a,b of the process of FIG. 6

In some embodiments operations of block 711 are not performed. Instead, in some embodiments operations of blocks 713 and 715 are performed and in other some embodiments operations of blocks 723 and 725 are performed. In some embodiments the operations of blocks 713 and 715 are in accordance with functions discussed with respect to FIGS. 2A-D. In some embodiments the operations of blocks 723 and 725 are in accordance with functions discussed with respect to FIGS. 3A-D.

If the operations of block 711 are to be performed, in block 711 the process determines if a triggering device has been rotated to a new position and held in that new position. In some embodiments the process determines that the triggering device has been rotated to a new position and held in that new position based on information from one or more motion-related sensors. In some embodiments the process determines that the triggering device has been rotated to a new position and held in that new position based on information from at least one accelerometer from a portable electronic device. In some embodiments the process determines that the triggering device has been rotated to a new position and held in that new position based on information from at least one gyroscope of the portable electronic device. The portable electronic device may be, for example, the portable electronic device giving rise to the trigger event of the process of FIG. 6. In some embodiments the process requires that the rotation of the triggering device be of a predetermined magnitude. For example, in some embodiments rotation of the portable electronic device is to be substantially equal to a multiple of 360 degrees divided by x, x being the number of "walls" that may serve as a floor in the virtual game world. In some embodiments substantially equal to may mean within one half of 360 degrees divided by x, in some embodiments within one third of 360 degrees divided by x, and in some embodiments one ninth of 360 degrees divided by x. In some embodiments the rotation of the portable electronic device is in a nonzero multiple of 180 degrees. In some embodiments the rotation of the portable electronic device is in a nonzero multiple of 90 degrees.

If the portable electronic device is determined to be so rotated, the process continues to block 723. Otherwise, the process continues to block 713. In some embodiments the process continuing to block 713 indicates that a triggering event has occurred, for example as discussed with respect to FIG. 6, but not one in which the triggering device has been rotated and held in the newly rotated position. Instead, in some embodiments, the triggering event may be considered a flicking of the portable electronic device. In some embodiments flicking may be a light sharp quick movement of the portable electronic device. In some embodiments flicking may be a change in yaw of the portable electronic device, but not one in which the portable electronic device is rotated and held in the newly rotated position. In some embodiments the change in yaw is measured by a change of 15 degrees to 75 degrees within a predetermined time period, and in some embodiments the change in yaw is measured by a rate of change greater than a predetermined magnitude within a predetermined time period.

In block 713 the process rotates the virtual game world direction of gravity and display of the virtual game world for the portable electronic device. In some embodiments the virtual game world gravity is a force applied in a downward direction relative to a bottom of the portable electronic device in a held position. In some embodiments direction of the virtual game world gravity is rotated by yawing the virtual gravity 90 degrees relative to the virtual game world. In such embodiments displayed orientation of the virtual game world is also yawed 90 degrees with respect to the portable electronic device. In some embodiments the process modifies the portable electronic device in accordance with FIGS. 2A and 2C.

In block 715 the process provides new virtual game world gravity and display directions to other devices. In some embodiments other devices are at least one other portable electronic device, for example at least one other portable electronic device of FIG. 1. If the process does not detect at least one other device in electronic communication with the portable electronic device wherein the virtual game world of the portable electronic device and the virtual game world of the at least one other device are exchanging data with each other the process returns. In some embodiments the gravity and orientation directions are 90 degrees relative to a prior gravity and orientation direction. In some embodiments the process provides display and gravity directions in accordance with FIGS. 2B and 2D.

The process thereafter returns.

In block 723 the process rotates the direction of virtual game world gravity on the portable electronic device. In some embodiments the direction of gravity in the virtual game world is rotated, or yawed, by a same amount as rotation of the portable electronic device. As an example, in some embodiments the portable electronic device may be rotated by one hundred eighty degrees, such that what was a "floor" in the virtual game world has now become a "ceiling", and vice versa. In such embodiments, and in situations in which the portable electronic device is held with the display at 90 degrees to the real ground, the direction of gravity in the virtual world may remain aligned with real world gravity both before and after rotation, while the virtual world is rotated by one hundred eighty degrees. With respect to the virtual world, however, the virtual gravity has rotated by one hundred eighty degrees. In some embodiments, therefore, the operations of block 723 may be considered to perform operations in accordance with FIGS. 3A and 3C.

In block 725 the process provides new virtual game world gravity directions to other devices. In some embodiments other devices are at least one other portable electronic device, for example at least one other portable electronic device of FIG. 1. If the process does not detect at least one other device in electronic communication with the portable electronic device wherein the virtual game world of the portable electronic device and the virtual game world of the at least one other device are exchanging data with each other the process returns, in some embodiments. In some embodiments, result of operations of block 725 may be considered to allow for results in accordance with FIGS. 3B and 3D.

The process thereafter returns.

Figure 8:
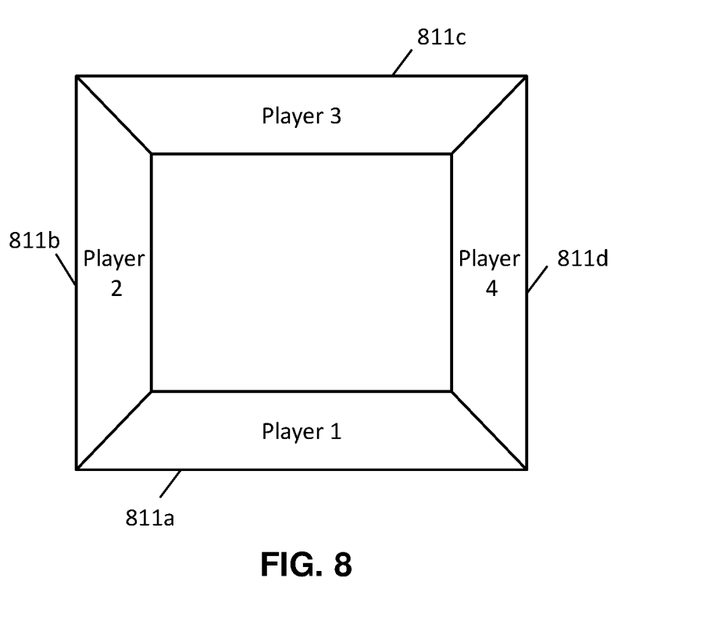
FIG. 8 illustrates aspects of a virtual world, identifying portions of the virtual world to be determined by various game players, in accordance with aspects of the invention.

FIG. 8 illustrates aspects of a virtual world, identifying portions of the virtual world to be determined by various game players, in accordance with aspects of the invention. In some embodiments the virtual world comprises a chamber. In FIG. 8 the chamber comprises four planar walls, a first wall 811*a*, a second wall 811*b*, a third wall 811*c*, and a fourth wall 811*d*. Each of the planar walls may include a length in one direction and a depth in another direction, the other direction being normal or at right angles to the one direction. For FIG. 8, the first wall and the third wall oppose one another, with the second wall and fourth wall extend from opposing edges of the length of the first wall to opposing edges of the length of the fourth wall. As indicated in FIG. 8, the first wall is associated with a Player 1, the second wall is associated with a Player 2, the third wall is associated with a Player 3, and the fourth wall is associated with a Player 4. Each of the players may be, for example, users who expect to take part as players in a multi-player video game, in which the chamber comprises the virtual world. In some embodiments each of the players may configure their walls in the virtual world, for example by indicating various objects or items to be placed on each of their walls.

Figure 9:
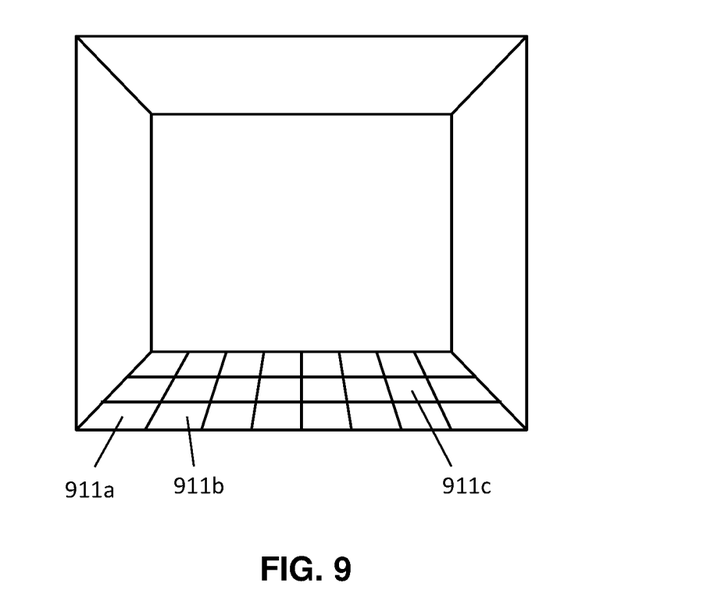
FIG. 9 illustrates layout sections for use by a game player in determining contents of a portion of a virtual world, in accordance with aspects of the invention.

FIG. 9 illustrates layout sections for use by a game player in determining contents of a portion of a virtual world, in accordance with aspects of the invention. For FIG. 9, the game player may be considered to be Player 1 of FIG. 8, with FIG. 9 showing details of an example display for use by Player 1 of FIG. 8 in configuring the first wall of FIG. 8 for game play.

In FIG. 9, the first wall, second wall, third wall, and fourth wall are shown arranged as discussed with respect to FIG. 8. FIG. 9 additionally includes a grid laid out over the first wall. The grid includes 24 equally spaced squares, arranged in 3 rows extending across the length of the first wall. In various embodiments other numbers of squares may be used, and in various embodiments different shapes and even differing shapes may be used.

In operation, Player 1 may select, for example using a pull-down menu or otherwise, objections or items to place in various locations within the grid. For example, Player 1 may select a first object to be placed on the wall in a first square 911*a* and a select a second object to be attached to the first wall in a third square 911*c*, with no object selected for a second square 911*b*. During later game play, the objects form part of the virtual world.

Although the invention has been discussed with respect to various embodiments, it should be recognized that the invention comprises the novel and non-obvious claims supported by this disclosure.

What is claimed is:

1. A game device configured for play of a video game, comprising:
   a frame;
   a display coupled to the frame;
   at least one processor coupled to the frame, the least one processor configured to provide display information of a virtual world of game play and game characters in the virtual world for display by the display;
   a touchscreen coupled to the frame, the touchscreen configured to provide user inputs based on contact with the touchscreen; and
   at least one motion or orientation related sensor coupled to the frame, the at least one motion or orientation related sensor configured to provide information related to movement or orientation of the frame;
   wherein the at least one processor is configured by program instructions to:
      determine actions of a game character in the virtual world of game play based on the user inputs; and
      determine modifications to the virtual world based on the information related to movement or orientation of the frame provided by the at least one motion or orientation related sensor;
   wherein the modifications to the virtual world comprise rotations with respect to the game character within the virtual world.

2. The game device of claim 1, wherein the virtual world exhibits effects of a virtual gravitational field, and the rotations of the virtual world are with respect to the virtual gravitational field.

3. The game device of claim 1, wherein the rotations of the virtual world correspond to rotations of the frame, as indicated by the information related to movement or orientation of the frame provided by the at least one motion or orientation related sensor.

4. The game device of claim 3, wherein the at least one motion or orientation related sensor comprises at least one gyroscope.

5. The game device of claim 3, wherein the at least one motion or orientation related sensor comprises at least one accelerometer.

6. The game device of claim 1, wherein the at least one processor is configured by program instructions to determine rotations of the virtual world based on the information related to movement or orientation of the frame indicating occurrence of a predetermined rotational motion of the frame.

7. The game device of claim 6, wherein the predetermined rotational motion of the frame comprises a rotational motion of the frame through a predetermined angular displacement.

8. The game device of claim 7, wherein the predetermined rotational motion of the frame further comprises a rotational motion of the frame having at least a predetermined angular acceleration.

9. A game device configured for play of a video game, comprising:
 a frame;
 a display coupled to the frame;
 at least one processor coupled to the frame, the least one processor configured to provide display information of a virtual world of game play and game characters in the virtual world for display by the display;
 a touchscreen coupled to the frame, the touchscreen configured to provide user inputs based on contact with the touchscreen; and
 at least one motion or orientation related sensor coupled to the frame, the at least one motion or orientation related sensor configured to provide information related to movement or orientation of the frame;
 wherein the at least one processor is configured by program instructions to:
  determine actions of a game character in the virtual world of game play based on the user inputs; and
  determine modifications to the virtual world based on the information related to movement or orientation of the frame provided by the at least one motion or orientation related sensor;
 wherein the virtual world exhibits effects of a virtual gravitational field, and the modifications to the virtual world comprise translations of the virtual world in the virtual gravitational field, with the translations including acceleration of portions of the virtual world with respect to the game character at a beginning of the translations and a deceleration of the portions of the virtual world at an end of the translations, and with floating or partially floating objects in the game world and the game character reacting to the acceleration and deceleration.

10. The game device of claim 9, wherein the at least one processor is configured by program instructions to determine translations of the virtual world based on the information related to movement or orientation of the frame indicating occurrence of a predetermined translational motion of the frame.

11. The game device of claim 10, wherein the translations of the virtual world comprise horizontal translations of a playable portion of the virtual world.

12. The game device of claim 11, wherein the horizontal translations of the playable portion of the virtual world comprise an acceleration of the playable portion of the virtual world in a first direction and a corresponding deceleration of the playable portion of the virtual world in the first direction.

\* \* \* \* \*